(12) United States Patent
Oba et al.

(10) Patent No.: US 9,013,729 B2
(45) Date of Patent: Apr. 21, 2015

(54) MOBILE TERMINAL APPARATUS AND MOBILE PRINT APPLICATION

(75) Inventors: Kazutaka Oba, Johns Creek, GA (US); Tomoki Hattori, Suwanee, GA (US)

(73) Assignees: Ricoh Company, Ltd., Tokyo (JP); Ricoh Americas Corporation, West Caldwell, NJ (US)

(*) Notice: Subject to any disclaimer, the term of this patent is extended or adjusted under 35 U.S.C. 154(b) by 247 days.

(21) Appl. No.: 13/312,392

(22) Filed: Dec. 6, 2011

(65) Prior Publication Data
US 2013/0141747 A1 Jun. 6, 2013

(51) Int. Cl.
*G06K 15/00* (2006.01)
*H04N 1/00* (2006.01)
*H04N 1/32* (2006.01)
*G06F 3/12* (2006.01)

(52) U.S. Cl.
CPC ............ *G06F 3/1292* (2013.01); *G06F 3/1204* (2013.01); *G06F 3/1222* (2013.01); *G06F 3/1238* (2013.01); *G06F 3/1271* (2013.01); *H04N 1/0023* (2013.01); *H04N 1/00233* (2013.01); *H04N 1/00307* (2013.01); *H04N 1/00342* (2013.01); *H04N 1/00464* (2013.01); *H04N 1/32117* (2013.01); *H04N 2201/0082* (2013.01); *H04N 2201/0094* (2013.01); *H04N 2201/3205* (2013.01); *H04N 2201/3208* (2013.01); *H04N 2201/3226* (2013.01); *H04N 2201/3278* (2013.01)

(58) Field of Classification Search
CPC ... G06F 3/1236; G06F 3/1271; G06F 3/1292; H04N 1/00233; H04N 1/00307
See application file for complete search history.

(56) References Cited

U.S. PATENT DOCUMENTS

| | | | |
|---|---|---|---|
| 7,793,285 B2 | 9/2010 | Hattori et al. | |
| 2007/0233834 A1 | 10/2007 | Hattori et al. | |
| 2007/0234354 A1 | 10/2007 | Hattori | |
| 2008/0231886 A1 | 9/2008 | Wehner et al. | |
| 2008/0235241 A1 | 9/2008 | Hattori et al. | |
| 2009/0059272 A1 | 3/2009 | Matsushita et al. | |
| 2010/0172680 A1* | 7/2010 | Butcher | 400/76 |
| 2010/0231958 A1* | 9/2010 | Okigami | 358/1.15 |
| 2011/0255111 A1 | 10/2011 | Oba et al. | |
| 2011/0261391 A1 | 10/2011 | Oba et al. | |

* cited by examiner

*Primary Examiner* — Thierry L Pham
(74) *Attorney, Agent, or Firm* — Cooper & Dunham LLP

(57) ABSTRACT

Apparatuses, systems and methods that operate to print information and documents stored on a mobile terminal device.

18 Claims, 18 Drawing Sheets

File Browse Page

URL: http://1/2.92.100.100/mobileprint

Please Select One Or More Files:

-[Q]-...
-[R]-...
-[S]-...
   - Sample1.doc
   - Sample2.doc
   - SAT Tutorial Folder
      - SAT Tutorial Ch 1.xls
      - SAT Tutorial Ch 2.xls
      - SAT Tutorial Ch 3.ppt
      - SAT Tutorial Ch 4.ppt
   - Saturdays yoga schedule.pdf
   - Sociology 103 lecture notes.pdf
-[T]-...
-[U]-...
-[V]-...
-[W]-...
-[X]-...
-[Y]-...

[Start Print] [Print and Store]

Fig. 3

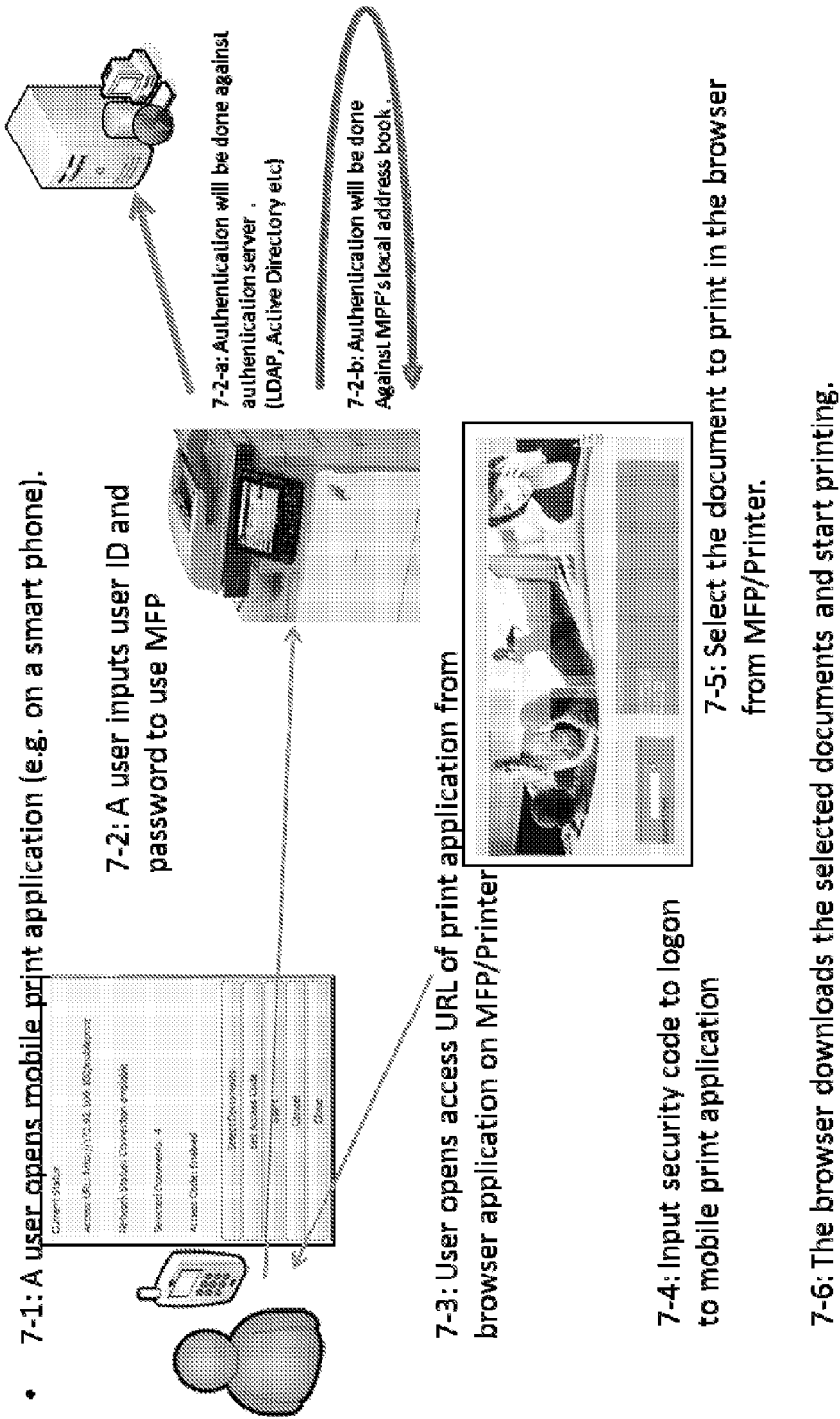

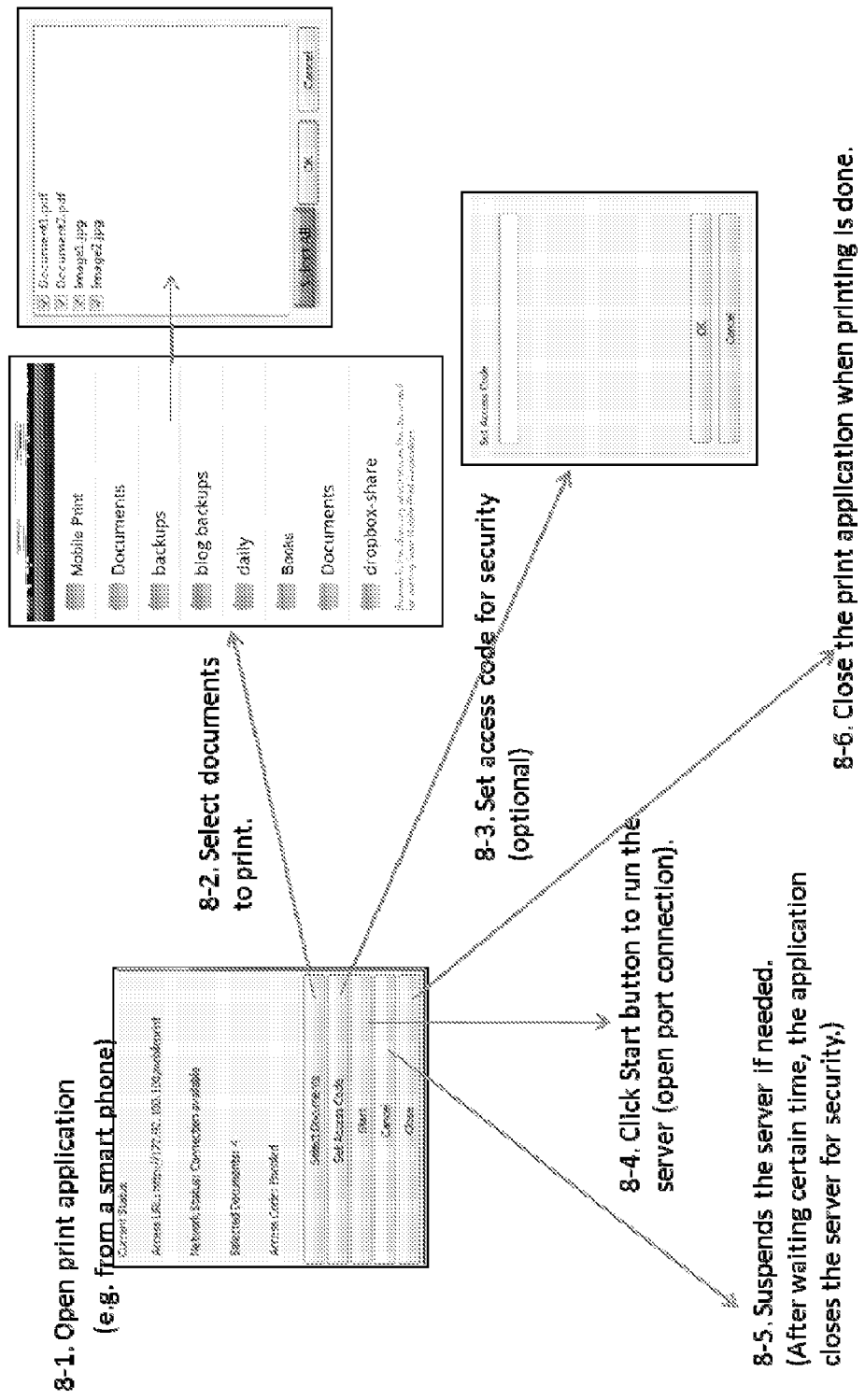

MOBILE TERMINAL APPARATUS AND MOBILE PRINT APPLICATION

TECHNICAL FIELD

This disclosure relates to tools (systems, apparatuses, methodologies, computer program products, etc.) for printing data and documents stored on a mobile terminal device.

BACKGROUND

In the current information age, mobile information technology (IT) tools are extensively used by members of the public, as well as by enterprises and other organizations, in order to provide convenient storage of various documents and data. In particular, mobile devices such as smartphones, notebook and laptop computers, PDAs (personal digital assistants), tablet computing devices, and so forth, are becoming extremely prolific. Such devices are able to store the documents and data of the user, and allow the user to access such information in many different locations.

When users with such mobile terminal devices wish to print documents, files or other information stored on the mobile terminal devices, the users are often forced to upload the desired documents to a web server, document hosting service or some other application program that is provided in the "cloud", i.e. that is hosted on a network such as the World Wide Web or Internet.

There is a significant drawback, however, in that transmitting documents and data to the Internet or a cloud-based service for printing may pose significant security risks. That is, since the data may be retained on a publically-accessible network, there is a possibility that the data may be intercepted and obtained by unauthorized third parties. Thus, many users may not wish to send print jobs to the cloud, especially if the print jobs include information of a private or confidential nature.

There exists a need for an improved system from printing documents and other information from mobile terminal devices such as smartphones, notebook and laptop computers, PDAs (personal digital assistants), tablet computing devices, etc.

SUMMARY

In an aspect of this disclosure, there is provided a tool (for example, an apparatus, mobile print application software, etc.) that enables a user to operate a user interface of a network connected device to select, for printing, documents and data stored on a remote device (e.g., a mobile terminal apparatus). Such tool allows the terminal apparatus to identify available print devices, and to function as a file server to host a file browse page (e.g. a web page) that is accessible by a browser application of the network connected device (e.g. print device). The file browse page indicates the files on the terminal apparatus that are accessible for printing, and can serve as a web portal to allow a user to request, from remotely, access to the files stored on the mobile terminal apparatus. Thus, the user, while operating a user interface on a device remote from the mobile terminal apparatus, is able to print the desired documents and data via the web page hosted by the terminal apparatus. Since the documents and data are not being hosted or retained on a Web document hosting service or some other cloud-based service, there is a reduced possibility that the data may be intercepted or obtained by unauthorized third parties, and the security of the user's information is greatly enhanced.

In another aspect, a mobile terminal apparatus, including a print application, comprises a device certification part that identifies a print device within a predetermined range from the terminal apparatus, establishes a direct communication link between the terminal apparatus and the print device, and communicates identification information via the communication link with the print device, and performs a certification process to certify the print device.

In another aspect, the mobile terminals apparatus comprises a file server part that communicates, to the certified print device via the network, a file browse page for user selection of one or more files stored on the terminal apparatus, and receives a request, from a browser application of the print device, for a specified file, selected by the user from one or more files displayed via the file browse page, and transmits the specified file via the network to the print device for printing.

In another aspect, after the print device is certified by the device certification part, the file server part transmits resource locator information of the file browse page to the print device In another aspect, the mobile terminal apparatus displays a user interface for selection of files to be indicated on the file browse page, from amongst files stored on the terminal apparatus, and the file browse page communicated by the file server part only indicates the selected files as available for printing.

In another aspect, the mobile terminal apparatus displays a user interface for user specification of an access code, and the file server part receives, via the network, a specified code (e.g., entered by a user) from the browser application of the print device, and the file server part, only in a case that the specified code matches the access code, communicates the file browse page indicating the one or more files to the print device.

In another aspect, the mobile terminal apparatus displays a user interface for user selection of one of plural print devices detected by the device certification part, and the device certification part only performs the certification process with the selected print device In another aspect, the device certification part identifies the print device via a short-range wireless connection distinct from said network.

In another aspect, the device certification part scans a barcode displayed on the print device, and decodes the barcode to identify the print device.

In another aspect, the print device includes an RFID unit, and the terminal apparatus communicates with the RFID unit of the print device to identify the print device.

In another aspect, a print device comprises a communication part that communicates directly with a mobile terminal apparatus within a specific distance of the print device, to establish a communication link between the print device and terminal apparatus, and a browser application part of the print device communicates with the terminal apparatus to receive from the terminal apparatus a file browse page indicating files stored on the terminal apparatus, displays the file browse page and receive user selection of one or more of the files stored on the terminal apparatus, and transmits a request for the selected file, to the terminal apparatus; and a printing unit that prints the selected file when received from the terminal apparatus.

In another aspect, the browser application part of the print device receives resource locator information of the file browse page from the terminal apparatus, and the browser application automatically utilizes the resource locator information to specify a destination address in the browser application to thereby transmit the file access request to the terminal apparatus.

In another aspect, the browser application of the print device displays a user interface for user specification of an access code, wherein the print device transmits, via the network, the access code to the terminal apparatus. The browser application only receives the file browse page from the file server part, if the terminal apparatus authenticates the access code.

BRIEF DESCRIPTION OF THE DRAWINGS

The aforementioned and other aspects, features and advantages can be more readily understood from the following detailed description with reference to the accompanying drawings wherein:

FIG. 3 illustrates an example of a file browse page displayed on a browser application of a printing device;

FIG. 7 illustrates an example of an overall workflow that may be performed by the mobile terminal apparatus 10 and print device 17 illustrated in FIG. 1;

FIG. 8 illustrates an example of a workflow that may be performed by the mobile terminal apparatus 10 illustrated in FIG. 1;

DETAILED DESCRIPTION

Figure 1:
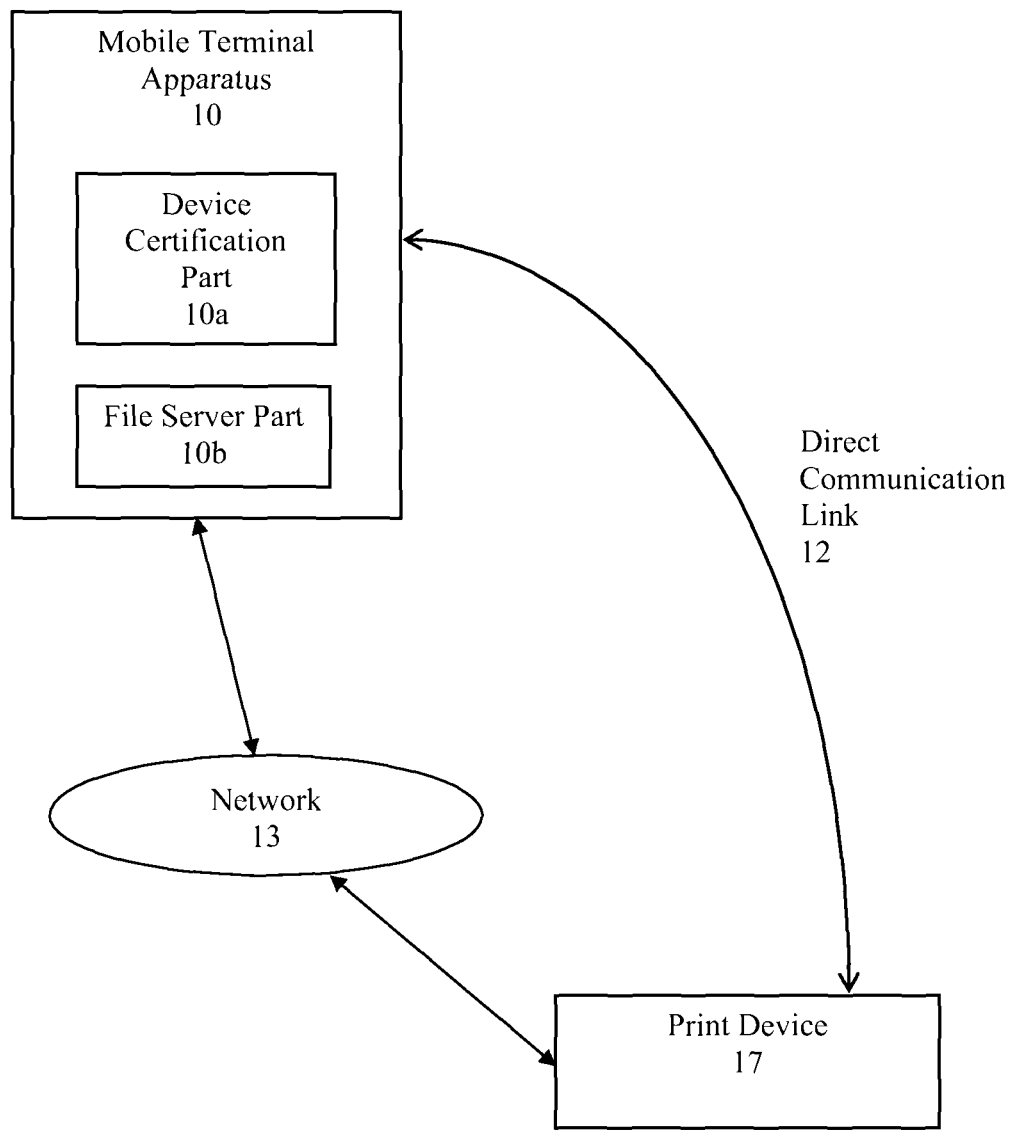
FIG. 1 shows a block diagram of a system including a mobile terminal apparatus and a printing device, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for printing information and documents stored on a mobile terminal apparatus.

For example, FIG. 1 shows schematically an system 100 for printing information and documents stored on a mobile terminal apparatus with use of a print device. As illustrated in FIG. 1, the system 100 includes a mobile terminal apparatus 10 and a print device 17. The mobile terminal apparatus 10 and the printing device 17 may be connected by a network 13 such as the internet, and/or may be connected via a separate direct communication link 12, as will be described in more detail hereinafter. As illustrated in FIG. 1, the mobile terminal apparatus includes a device certification part 10a and a file server part 10b.

The device certification part 10 of the mobile terminal apparatus 10 is configured to identify a print device within a specific distance (e.g. 1-10 meters) of the terminal apparatus, such as print device 17. The device certification part also establishes a direct communication link 12 between the terminal apparatus and the print device 17, and communicates identification information via the direct communication link 12 with the print device. The device certification part 10a also performs a certification process to certify the print device 17.

The device certification part 10 may identify a print device within a specific distance of the terminal apparatus in any one of a number of ways. For example, the device certification part may identify the print device by establishing a short-range wireless connection distinct from the network 13, wherein the short range wireless connection corresponds to the direct communication link 12 illustrated in FIG. 1. An example of a short-range wireless connected distinct from the network 13 is a Bluetooth protocol wireless connection, wherein the mobile terminal apparatus 10 may detect and communicate with the print device 17 if both are equipped for bluetooth communication. With the Bluetooth connection, the device certification part may utilize a Session Description Protocol (SDP) in order to discover the print device 17 and establish a link with the print device, wherein SDP is intended for describing multimedia communication sessions for the purposes of session announcement, session invitation, and parameter negotiation between end points of media type, format, and all associated properties. Aspects of bluetooth connections and protocols are conventional, and therefore in order to avoid occluding the inventive aspects of this disclosure, such conventional aspects will not be discussed in detail herein.

After the device certification part establishes the direct communication link 12 between the terminal apparatus and the print device 17, the device certification part communicates identification information via the direct communication link 12 with the print device. For example, a custom bluetooth driver can take control of the communications process using a custom flow to establish a device information exchange process with the print device 17 via the bluetooth connection, in order to exchange information such IP address, Hostname, device configuration information (PDL, Finishing modes, HDD, etc.), and so forth, between the mobile terminal apparatus 10 and the print device 17. In this way, the device certification part 10a may perform a certification process to certify the print device 17.

The device certification part 10 may identify a print device within a specific distance of the terminal apparatus in other ways. For example, the print device 17 may display a barcode on a physical label attached to the exterior structure or frame of the print device 17. Alternatively, a visual representation of the barcode may be displayed electronically on a display unit (e.g. monitor, LCD screen, etc.) of the print device 17.

As used herein, the term 'barcode' refers to an optical machine-readable representation of data. The data encoded in the barcode is referred to in this disclosure as 'barcode data'. For example, a common type of barcode includes a linear barcode, also referred to as a one-dimensional barcode, wherein such a barcode represents information by varying the width, height and/or spacing of a plurality of parallel lines. Another common type of barcode includes matrix barcode, also referred to as a two-dimensional barcode, wherein such a barcode represents information using rectangles, dots, hexagons and other geometric patterns in 2 dimensions. A popular type of matrix barcode is a QR code. Barcodes are often attached to the exterior and/or packaging of various products and items in order to represent information pertaining to that product or item. The information represented by a barcode may include, for example, the manufacturer of the barcode, the type of the product, the model of the product, the identity of the product, the serial number of the product, etc. The barcodes may be scanned and read by special optical scanners called barcode readers, although scanners, cameras and interpretive software are available on devices including desktop printers and smartphones. For example, the mobile terminal apparatus 10 may include a barcode reader or special optical scanner, or may include a scanner, camera and/or interpretive software to read the barcode. The technology relating to barcodes and the different types of barcodes are well understood by those skilled in the art, and will not be discussed in further detail herein in order to avoid occluding the aspects of this disclosure.

The barcode of the print device 17 may display various information corresponding to the print device 17, such as device name, device model number, device serial number, device characteristics (PDL, Finishing modes, HDD, etc.), IP address, host name, and so forth. According to an aspect of this disclosure, the barcode displayed on the display unit of the print device 17 may be updated by a processor of the print device 17 in order to represent the most up-to-date information regarding the device, such as current device characteristics, IP address, host name, and so forth. Meanwhile, the mobile terminal apparatus 10 may include a barcode reader to read the information encoded in the barcode of the print device 17, as described above. Thus, in an aspect of this disclosure, the device certification part 10a scans a barcode displayed on the print device, using a barcode reader of the apparatus 10, and decodes the barcode to obtain the information represented by the barcode. The information represented by the barcode of the print device 17 may be encrypted, in which case the apparatus 10 decrypts the information. After the apparatus 10 obtains the information represented by the barcode, the device certification part 10a may utilize the obtained information identify the print device and establish a direct communication link 12 between the terminal apparatus and the print device 17 (e.g. via bluetooth connection). After the device certification part establishes the direct communication link 12 between the terminal apparatus and the print device 17, the device certification part 10a may perform a certification process to certify the print device 17.

The device certification part 10 may identify a print device within a specific distance of the terminal apparatus in still other ways. For example, the print device 17 may include an RFID (Radio Frequency Identification) tag unit, and the RFID tag unit of the print device 17 may represent various information corresponding to the print device 17, such as device name, device model number, device serial number, device characteristics (PDL, Finishing modes, HDD, etc.), IP address, host name, and so forth. The mobile terminal apparatus 10 communicates with the RFID unit of the print device, via an RF direct communication link (corresponding to direct communication link 12) to obtain the aforementioned information stored in the RFID tag, and to utilize the obtained information to identify the print device and perform a certification process to certify the print device 17.

Figure 2:
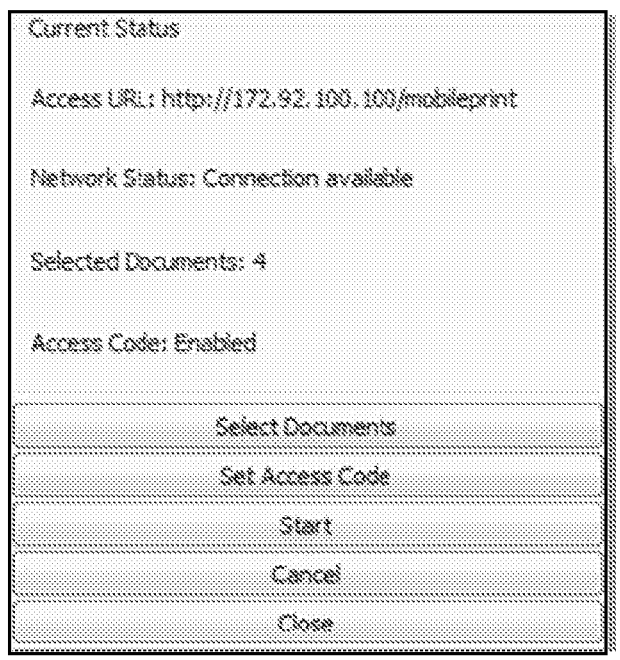
FIG. 2 illustrates an example of a user interface screen displayed on a mobile terminal apparatus.

After the print device 17 has been certified by the device certification part 10a of the mobile terminal apparatus 10, the file server part 10b of the mobile terminal apparatus is configured to operate and function as a web server connected to the network 13. That is, the file server part 10b is configured to function as a web server and 'host' a website or web page on the network 13, such that the web page is accessible from a specific Uniform Resource Identifier (URI) via the network 13. For example, the web page hosted by the file server part may correspond to a data file including HTML code, Javascript code, CSS code, and so forth, as is well known in the art. FIG. 2 illustrates a user interface screen displayed on a display part of the mobile terminal apparatus 10. The user interface screen of FIG. 2 indicates that the apparatus is configured to operate as web server and host a web page (such as a file browse page) that is accessible at a specific Uniform Resource Locator (URL), such as "http://1/2.92.100.100/mobileprint", as illustrated in FIG. 2. When the user presses the "Start" button illustrated in FIG. 2, this causes the file server part 10b to operate as the web server and host the web page (such as the file browse page) as described in this disclosure.

According to an exemplary embodiment, the web page hosted by the file server part 10b is a file browse page. That is, the file server part communicates, via the network 13, to the certified print device 17 (that was certified by the device certification part 10a), a file browse page for user selection of one or more files stored on the terminal apparatus. An example of such a file browse page is illustrated in FIG. 3. As seen in FIG. 3, the file browse page lists one or more files stored on the terminal apparatus, and permits a user to select one or more of the files stored on the terminal apparatus.

Once the user selects the appropriate files, the user may select the "Start Print" button seen in FIG. 3 to transmit a request from the browser application of the print device 17 to the mobile terminal apparatus 10, via the network 13. The request may correspond to a request for the files that were selected by the user on the file browser page. Thus, the file server part 10b is configured to receive a request, from the browser application of the print device 17, for a specified file, selected by the user from the one or more files via the file browse page, and the file server part 10b transmits the specified file via the network 13 to the print device 17. Once the print device receives the files from the mobile terminal apparatus 10, the print device may print the files. After the files are printed, the files may be deleted from the print device 17 in order to maintain the security and confidentiality of the information included in the files. On the other hand, after the files are printed, they may be stored on the print device 17 (e.g. when the user selects the "Print & Store" icon illustrated in FIG. 3).

Thus, in this exemplary embodiment, there is provided a tool (for example, an apparatus, mobile print application software, etc.) for printing documents and data stored on a mobile terminal apparatus. Such tool allows the apparatus to identify available print devices, and enables the apparatus to function as a file server to host a file browse page (e.g. a web page) that is accessible by a browser application of the print device via a network. The file browse page may indicate the files stored on the mobile terminal apparatus that are available for printing, and serves as a web portal to allow a user of the print device to request access to the files stored on the mobile terminal apparatus. Thus, the user of the print device is able to obtain the desired documents and data directly from the web page being hosted by the mobile terminal apparatus. Since the documents and data are not being hosted or retained on a Web document hosting service or some other cloud-based service, there is a reduced possibility that the data may be intercepted or obtained by unauthorized third parties, and the security of the user's information is greatly enhanced.

The mobile terminal apparatus 10 of this disclosure may be realized by a mobile print application or computer program product including a computer-usable, non-transient medium (such as a disk storage apparatus) having instructions tangibly embodied therein that are executed by a computer. Thus, it should be understood that the apparatus 10 may be executed on a computer, a client terminal and/or network-connected device. The components of the mobile terminal apparatus 10 such as the device certification part 10*a* and the file server part 10*b* may be manifested as software components corresponding to aforementioned mobile print application.

The apparatus 10 may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 13 may be provided via one or more of a secure intranet or extranet local area network, a wide area network (WAN), any type of network that allows secure access, etc., or a combination thereof. Further, other secure communications links (such as a virtual private network, a wireless link, etc.) may be used as well as the network connections. In addition, the network 13 may use TCP/IP (Transmission Control Protocol/Internet Protocol), but other protocols such as SNMP (Simple Network Management Protocol) and HTTP (Hypertext Transfer Protocol) can also be used. How devices can connect to and communicate over the networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 4:
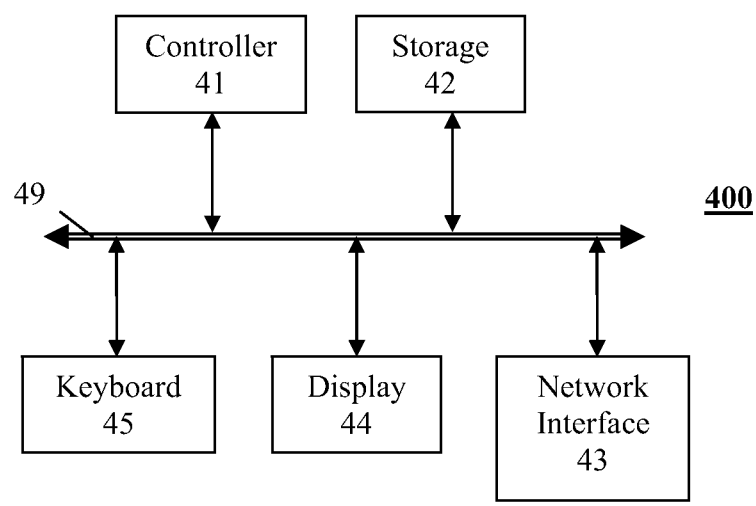
FIG. 4 shows a block diagram of an exemplary configuration of a computer that can be used to implement a mobile terminal apparatus, such as mobile terminal apparatus 10 illustrated in FIG. 1.

FIG. 4 shows an exemplary constitution of an apparatus as a computer, for example, that can be configured through software to provide the apparatus 10 illustrated in FIG. 1. As shown in FIG. 4, the computer 400 includes a controller (or central processing unit) 41 that communicates with a number of other components, including memory or storage part 42, network interface 43, display 44 and keyboard 45, by way of a system bus 49.

The computer 400 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In computer 400, the controller 41 executes program code instructions that controls device operations. The controller 41, memory/storage 42, network interface 43, display 44 and keyboard 45 are conventional, and therefore in order to avoid occluding the inventive aspects of this disclosure, such conventional aspects will not be discussed in detail herein.

The computer 400 includes the network interface 43 for communications through a network, such as communications through the network 13 with the print device 17 illustrated in FIG. 1. However, it should be appreciated that the subject matter of this disclosure is not limited to such configuration. For example, the apparatus 400 may communicate with client terminals through direct connections and/or through a network to which some components are not connected. As another example, the apparatus 400 need not be provided by a server that services terminals, but rather may communicate with the devices on a peer basis, or in another fashion.

Apparatus 10 is not limited to a computer or server, but can be manifested in any of various devices that can be configured to communicate over a network and/or the Internet.

The apparatus 10 and/or the print device 17 may be any network-connected device including but not limited to a personal, notebook or workstation computer, a terminal, a kiosk, a PDA (personal digital assistant), a tablet computing device, a smartphone, a scanner, a printer, a plotter, a facsimile machine, a multi-function device (MFD), a server, a mobile phone or handset, another information terminal, etc. Each device may be configured with software allowing the device to communicate through networks with other devices.

Figure 5:
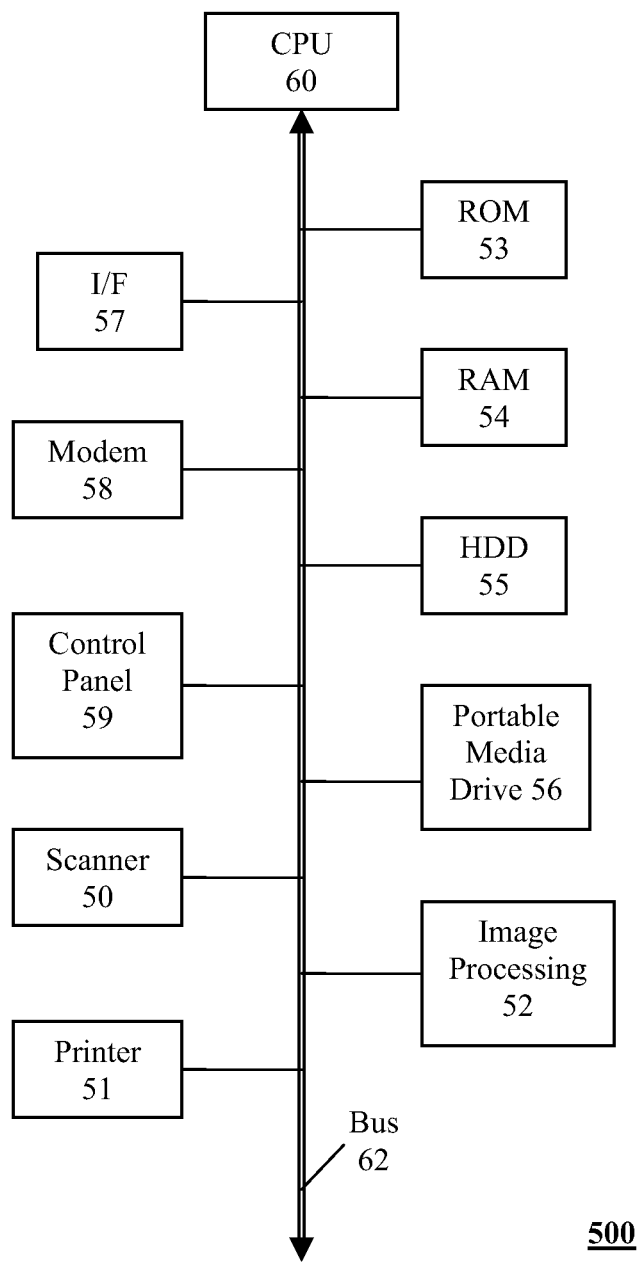
FIG. 5 shows a block diagram of an exemplary configuration of a multi-function device that can be used to implement a print device, such as print device 17 illustrated in FIG. 1.

An example of a configuration of a multi-function device (MFD) is shown schematically in FIG. 5. Device 500 includes a central processing unit (CPU) 60, and various elements connected to the CPU 60 by an internal bus 62. The CPU 60 services multiple tasks while monitoring the state of the device 500. The elements connected to the CPU 60 include a scanner unit 50, a printer unit 51, an image processing device 52, a read only memory (for example, ROM, PROM, EPROM, EEPROM, etc.) 53, a random access memory (RAM) 54, a hard disk drive (HDD) 55, portable media (for example, floppy disk, optical disc, magnetic discs, magneto-optical discs, semiconductor memory cards, etc.) drives 56, a communication interface (I/F) 57, a modem unit 58, and an operation panel 59.

Program code instructions for the device 500 can be stored on the read only memory 53, on the HDD 55, or on portable media and read by the portable media drive 56, transferred to the RAM 54 and executed by the CPU 60 to carry out the instructions. These instructions can include the instructions to the device to perform specified ones of its functions and permit the device 500 to interact with other network connected devices.

The operation panel 59 includes a display screen that displays information allowing the user of the device 500 to operate the device 500. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the device, so as to allow the operator to conveniently take advantage of the services provided by the system. The display screen does not need to be integral with, or embedded in, the operation panel 59, but may simply be coupled to the operation panel by either a wire or a wireless connection. The operation panel 59 may include keys for inputting information or requesting various operations. Alternatively, the operation panel 59 and the display screen may be operated by a keyboard, a mouse, a remote control, touching the display screen, voice recognition, or eye-movement tracking, or a combination thereof. The device 500 is a multifunction device (with scanner, printer and image processing) and in addition can be utilized as a terminal to download documents from a network.

Additional aspects or components of the device 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 6:
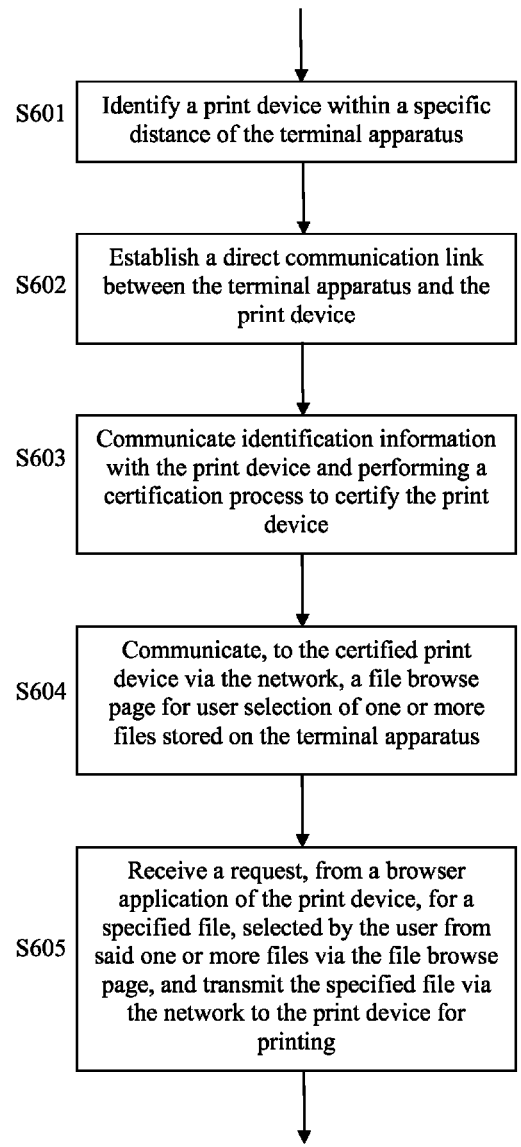
FIG. 6 shows a flowchart of a method performed by an apparatus, such as apparatus 10 illustrated in FIG. 1, according to an exemplary embodiment.

Turning now to FIG. 6, there is shown a flowchart of a method performed by an apparatus such as mobile terminal apparatus 10 illustrated in FIG. 1, according to an exemplary embodiment.

In S601, the apparatus 10 identifies a print device within a specific distance (e.g. 1-10 meters) of the terminal apparatus 10. In S602, the apparatus 10 establishes a direct communication link 12 between the terminal apparatus and the print device 17. In S603, the apparatus 10 communicates identification information with the print device 17 and performs a certification process to certify the print device.

Thereafter, in S604, the apparatus 10 communicates, via the network 13, to the certified print device 17 that was certified in S603, a file browse page for user selection of one or more files stored on the terminal apparatus 10. The file browse page may be displayed on a user interface screen or display part of the print device 17, by a browser application of the print device 17. An example of a file browse page is illustrated in FIG. 3. Finally, in S605, the apparatus 10 receives a request, from a browser application of the print device 17, for a specified file, selected by the user from the one or more files via the file browse page. The apparatus 10 transmits the specified file via the network 13 to the print device 17 for printing.

Turning now to FIG. 7, there is illustrated a more detailed overall workflow (including a print device authentication process) performed by the mobile terminal apparatus 10 and the print 17 of the system 100 illustrated in FIG. 1, according to a non-limiting exemplary embodiment.

In step 7-1 of FIG. 7, the user opens a mobile print application operating on the mobile terminal apparatus 10 (e.g. a smart phone). The user is presented with a user interface screen of the mobile print application on the mobile terminal apparatus 10, similar to the screen illustrated in FIG. 2. Thereafter, FIG. 8 describes the workflow that occurs on the terminal apparatus 10 side, when the user interacts with the user interface of the mobile print application on the mobile terminal apparatus 10.

In step 8-1 of FIG. 8, user opens a mobile print application operating on the mobile terminal apparatus 10 (e.g. a smart phone) as described above. The user interface of the mobile print application is also illustrated in FIG. 2. The user interface screen of FIG. 2 indicates that the apparatus is configured to operate as web server and host a web page (such as a file browse page) that is accessible at a specific Uniform Resource Locator (URL), such as "http://1/2.92.100.100/mobileprint", as illustrated in FIG. 2.

Figure 9A:
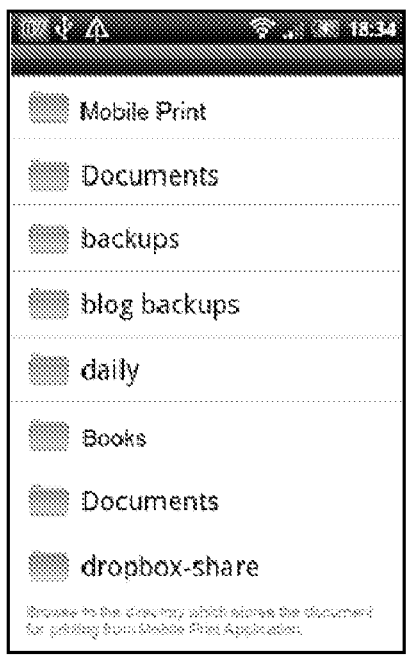
FIGS. 9A and 9B illustrates an example of user interface screens displayed on a mobile terminal apparatus, such as apparatus 10 depicted in FIG. 1, that allow a user to select files and documents stored on the mobile terminal apparatus.
Figure 9B:

In step 8-2, the user presses the "Select Documents" button of the user interface screen of the mobile print application. As a result the user may be presented with various user interface screens for selecting documents, files, folders and other types of data stored on the mobile terminal apparatus 10. For example, the user may be presented with the user interface screen of FIG. 9A which illustrates various folders of information stored on the apparatus 10. When the user selects one of the folders, such as "backups", the user is presented with a user interface screen indicating the files or documents stored in that folder, as illustrated in the example of FIG. 9B. The user is able to select a subset (i.e. one or more or all) of the files displayed in the user interface screen of FIG. 9B, to thereby designate which files will later be permitted to be shared with the print device 17.

Figure 10:
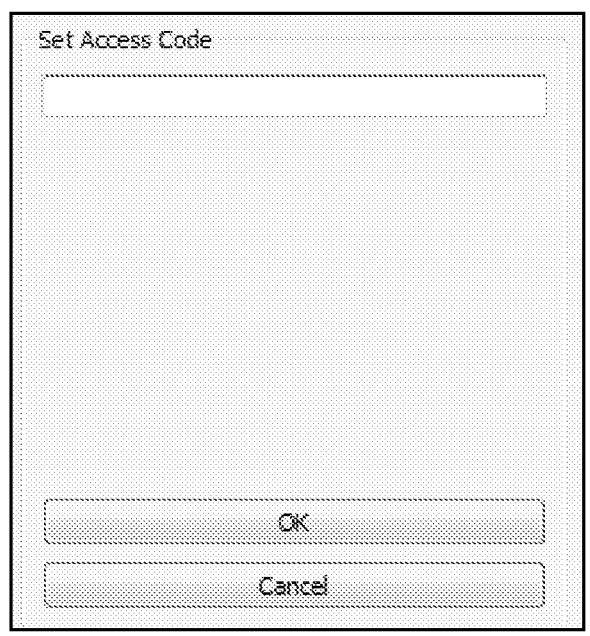
FIG. 10 illustrates an example of a user interface screen displayed on a mobile terminal apparatus, such as apparatus 10 depicted in FIG. 1, that allows a user to set an access code.

After the user selects files or documents to be shared with the print device 17 in step 8-2 of FIG. 8, the user may select the "Set Access Code" button in the user interface screen of the mobile print application (FIG. 2), and then the user is presented in step 8-3 with another user interface in order to set an access code. An example of such a user interface screen is illustrated in FIG. 10. The user may enter a desired access code into the user interface of FIG. 10, and press the "OK" button to set the access code. This same access code will later be required to be entered at the print device 17 side in order to complete the transfer of files to the print device 17 for printing, as will be described later. Step 8-3 is optional.

After the user sets the access code in step 8-3 of FIG. 8, the then the user may press the "Start" button in the user interface screen of the mobile print application (see FIG. 2 and FIG. 8). This causes the file server part 10b of the mobile print application of the mobile terminal apparatus 10 to operate as the web server and host the file browse page, which may be accessible using a browser application operating on the print device 17. As described in more detail below, the file browse page hosted on the network 13 in step 8-4 will list as available for printing only the subset of files that were selected in step 8-2. Moreover, the file server part 10b may transmit the access URL corresponding to the file browse page to a browser application of the print device 17.

If the user at the mobile apparatus 10 side wishes to suspend the operation of the file server part 10b, then the user in step 8-5 may click on the "Cancel" button of the user interface screen of the mobile print application (see FIG. 2 and FIG. 8). If the operation of the file server part 10b has been suspended for a predetermined time period (e.g. 5 minutes), then the file server part 10b and/or mobile print application may automatically close in order to ensure the safety of the system. Moreover, if the user wishes to close the mobile print application, then the user in step 8-6 may click on the "Close" button of the user interface screen of the mobile print application (see FIG. 2 and FIG. 8).

Figure 11A:
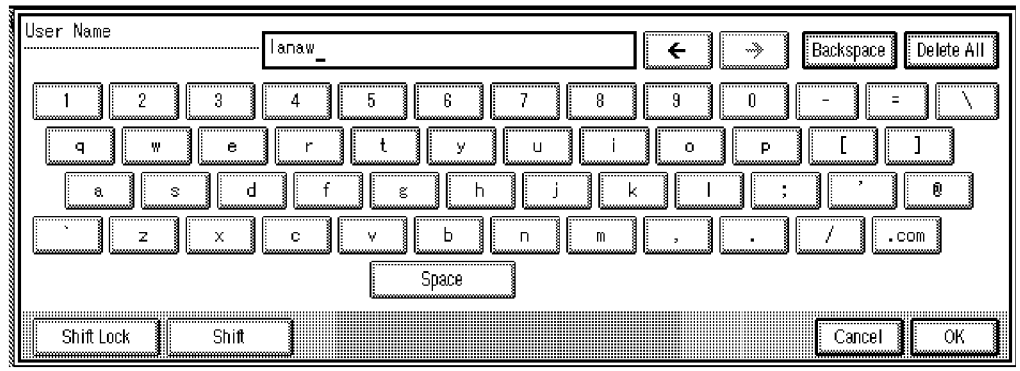
FIGS. 11A and 11B illustrate examples of user interface screens displayed on a multi-function device, such as print device 17 illustrated in FIG. 1, that allow a user to enter a user name and password for authentication.
Figure 11B:
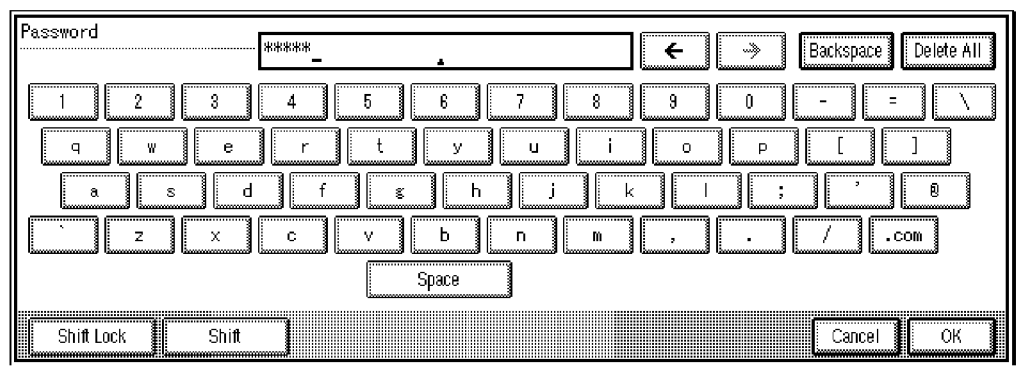

Referring back to FIG. 7, after one or more of the steps in the workflow of FIG. 8 have been performed, the user (which may be the same user that is operating the mobile terminal apparatus 10 or may be another user) may approach the print device 17 (e.g. a multi-function device MFD or multi-function product MFP), and enter their user name and password into one or more user interface screens displayed on a display part of the MFP in order to be authenticated. FIG. 11A illustrates an example of a user interface screen that may be displayed on the MFP in order to permit a user to enter their username. FIG. 11B illustrates an example of a user interface screen that may be displayed on the MFP in order to permit a user to enter their password. The user's username and password may be authenticated against an authentication server (e.g. using Lightweight Directory Access Protocol or Active Directory, etc.), as seen in step 7-2-*a* of FIG. 7. Instead, or in addition, the user's username and password may be authenticated against a local address book stored at the MFP, as seen in step 7-2-*a* of FIG. 7.

Other methods of authentication may also be used. For example, the multi-function device 17 may be equipped with one or more biometrics means (such as comparing fingerprints, palm prints, voice or speech, retinas or irises, facial expressions or features, signature, etc.). As another example, the multi-function device 17 may be equipped with a card reader to read an Identification Card or IC card of the user, in order to authenticate the user by checking the identification information, profile information, username, password, etc. stored on the IC card. The IC card may also stored identification information regarding the mobile terminal apparatus 10 in order to facilitate communication between the MFP 17 and the mobile terminal apparatus 10. For example, after the card reader of the MFP reads the identification information of the mobile terminal apparatus 10 from the IC card of the user, the MFP may initiate the direct communication link 12 with the mobile terminal apparatus 10 if such link is not already established.

Referring back to FIG. 7, after the user is authenticated at the MFP 17 in Step 7-2, the user may access a browser application of the MFP 17 in order to access the file browse page being hosted on the network 13 by the file server part 10*b* of the mobile terminal apparatus 10. According to an aspect of this disclosure, if the MFP is certified by the device certification part 10*a*, then the file server part 10*b* may transmit the access URL corresponding to the file browse page to the browser application of the MFP, and when the MFP receives the access URL, the MFP automatically loads the access URL into the browser application in order to access the file browse page via the network 13. Thus, the ease of use of the system is greatly increased and the burden on the user is decreased.

Figure 12:
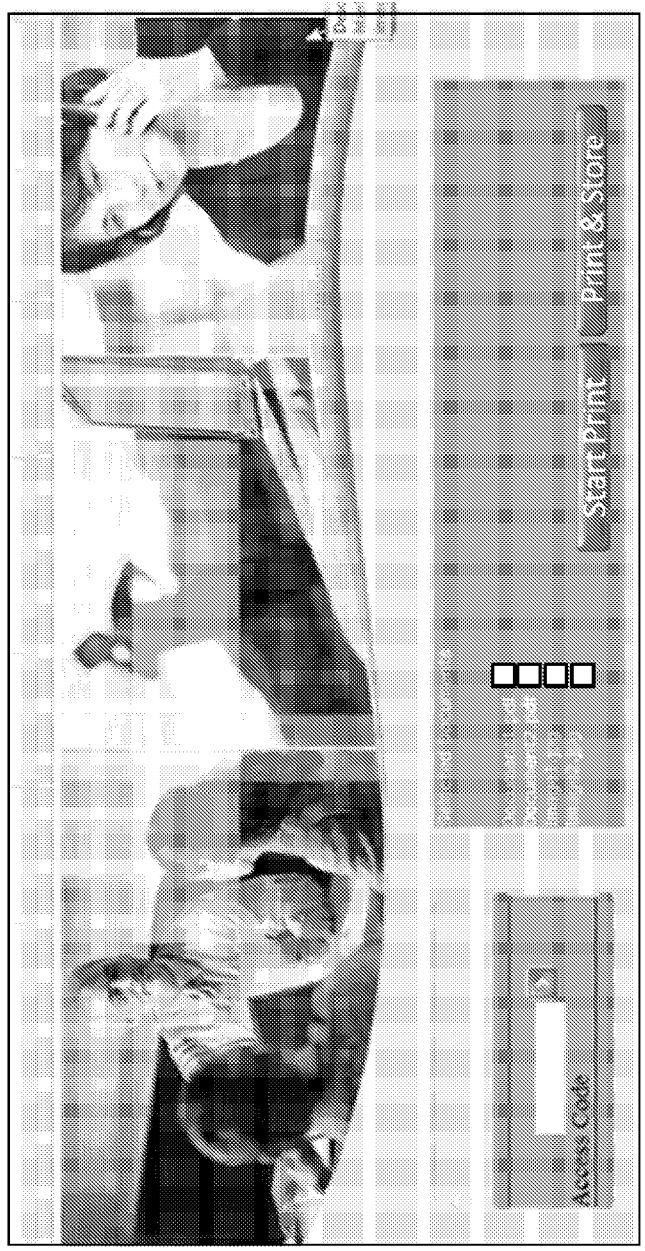
FIGS. 12 illustrates an example of a file browse page displayed on a browser application of a printing device, according to an exemplary embodiment.

An example of a file browse page is illustrated in FIG. 12. As seen in FIG. 12, the file browse page includes an Access Code entry area where a user of the MFP may enter an access code (see Step 7-4 of FIG. 7) via the browser application of the MFP 17. The access code entered at Step 7-4 is transmitted via the network 13 to the file server part 10*b* of the mobile apparatus 10, which compares the received access code against the access code set in the mobile print application at the mobile terminal apparatus side 10 (see Step 8-3 of FIG. 8). If the access codes match, then the user of the MFP is permitted to select, for printing, one or more of the documents displayed on the file browse page as being available for printing (see step 7-5 of FIG. 7). The file browse page will list as available for printing only the subset of files that were selected by the user of the mobile terminal apparatus 10 in step 8-2. After the user of the MFP selects the files for printing in step 7-5 (by selecting the "Start Print" button seen in FIG. 12), the request for the files is transmitted to the apparatus 10 via the network 13, and the apparatus 10 transmits the files to the MFP 17 via the network 13 for printing. After the files are printed, the files may be deleted from the print device 17 in order to maintain the security and confidentiality of the information included in the files. On the other hand, after the files are printed, they may be stored on the print device 17 (e.g. when the user selects the "Print & Store" icon illustrated in FIG. 12).

The file browse page illustrated in FIG. 12 displays both the access code entry area and the document selection area simultaneously. Other approaches are also possible. For example, the file browse page may initially only display the access code area and not the file document selection area. The access code entered by the user of the MFP 17 is transmitted via the network 13 to the file server part 10*b* of the mobile apparatus 10, which compares the received access code against the access code set in the mobile print application at the mobile terminal apparatus side 10. If the access codes match, then the document selection area may displayed in the file browse page by the file server part 10*b*, and the user of the MFP is permitted to select, for printing, one or more of the documents. As another example, a separate access code entry page may first be displayed on the browser application of the MFP, and the access code entered by the user of the MFP 17 is transmitted via the network 13 to the file server part 10*b* of the mobile apparatus 10, which compares the received access code against the access code set in the mobile print application at the mobile terminal apparatus side 10. If the access codes match, then the complete file browse page may be communicated to the MFP 17 and may be displayed on the MFP 17.

Each of steps 8-1 through 8-4 of the workflow of FIG. 8 may occur any time between step 7-1 of FIG. 7 (when the user starts the mobile print application on the apparatus 10) and step 7-3 of FIG. 7 (when the user accesses the URL of the file browse page via the network 13). That is, one or more of steps 8-1 through 8-4 of FIG. 8 may be performed before or after Step S7-2 of FIG. 7 (when the user logs into the MFP).

Figure 13:
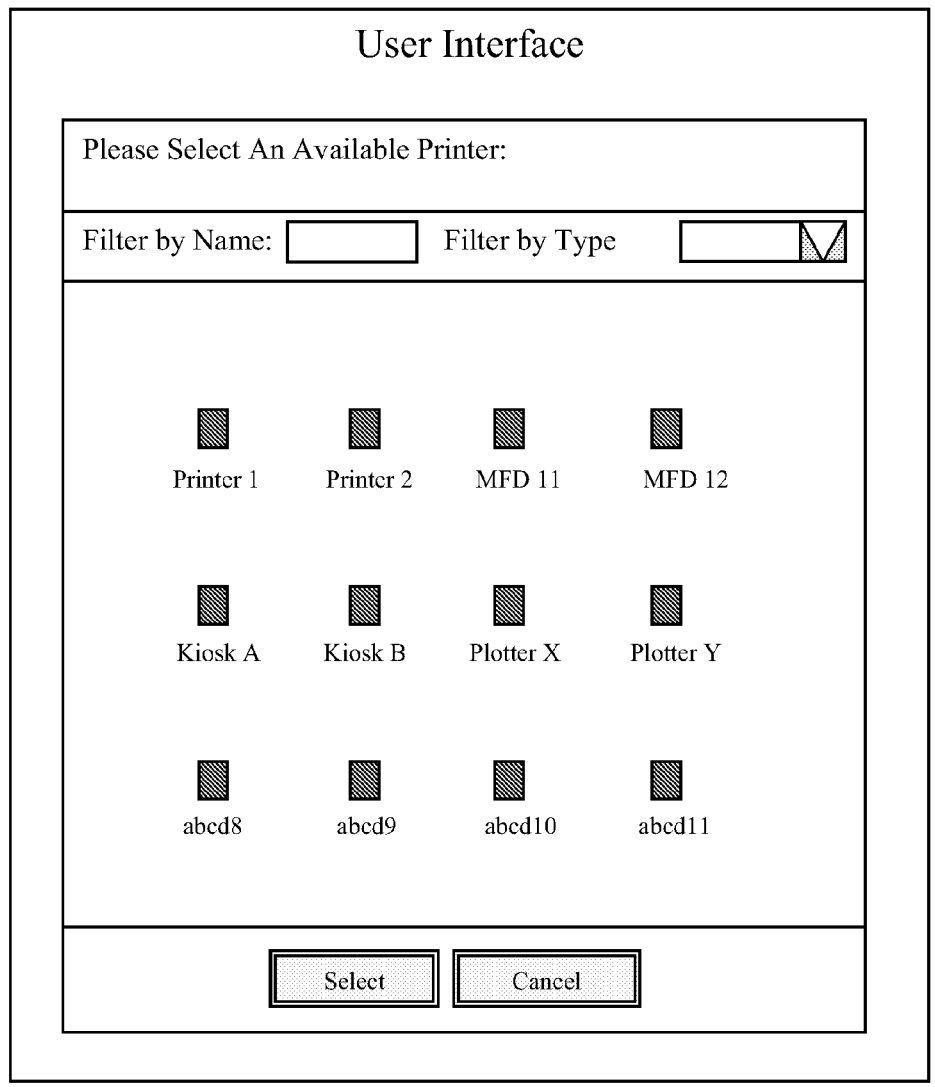
FIG. 13 illustrates an example of a user interface screen displayed on a mobile terminal apparatus, such as apparatus 10 depicted in FIG. 1, that allows a user to select a print device.

According to another aspect of this disclosure, when the device certification part 10*a* identifies a number of print devices within the predetermined distance of the mobile terminal apparatus 10, the user is presented with a user interface for user selection of one of the plural detected print devices. An example of such a user interface screen is illustrated in FIG. 13. Thereafter, the device certification part 10*a* only performs the device certification process with the particular print device selected by the user.

Figure 14A:
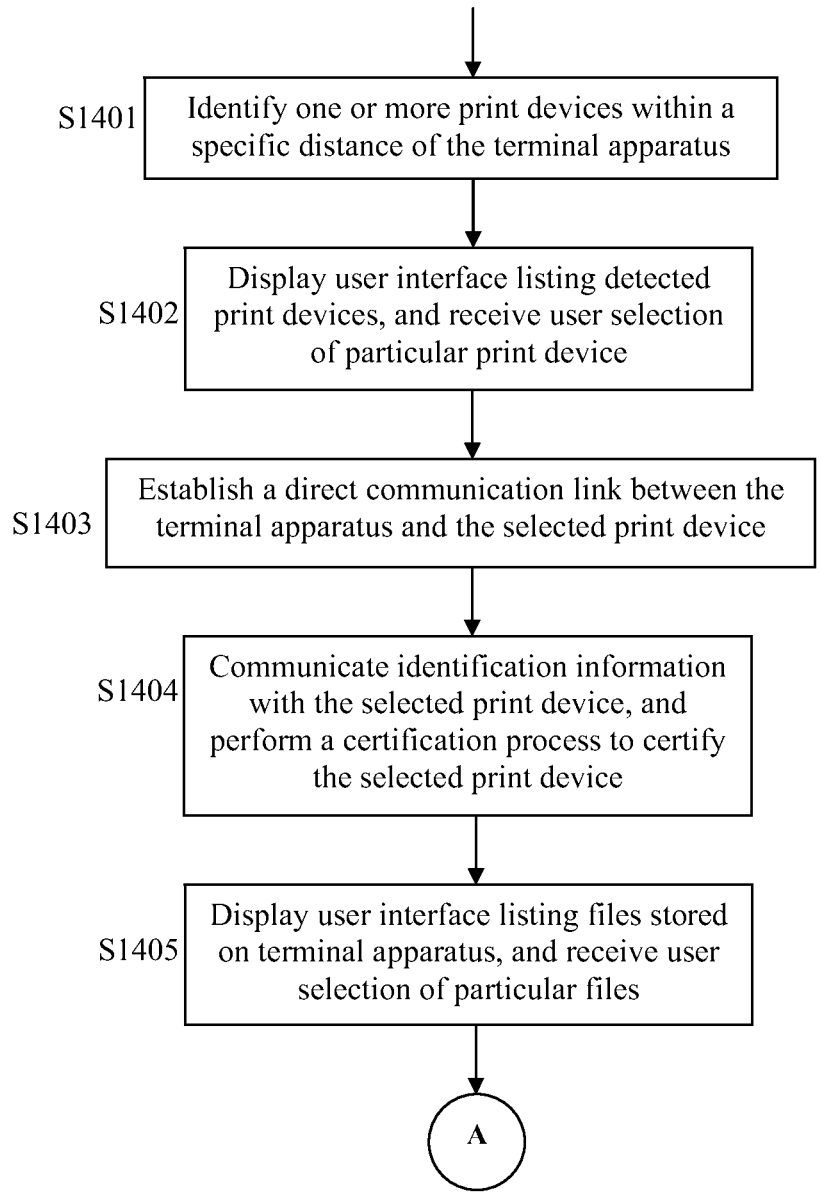
FIGS. 14A and 14B show a more detailed flowchart of a method performed by an apparatus, such as apparatus 10 illustrated in FIG. 1, according to another exemplary embodiment.
Figure 14B:
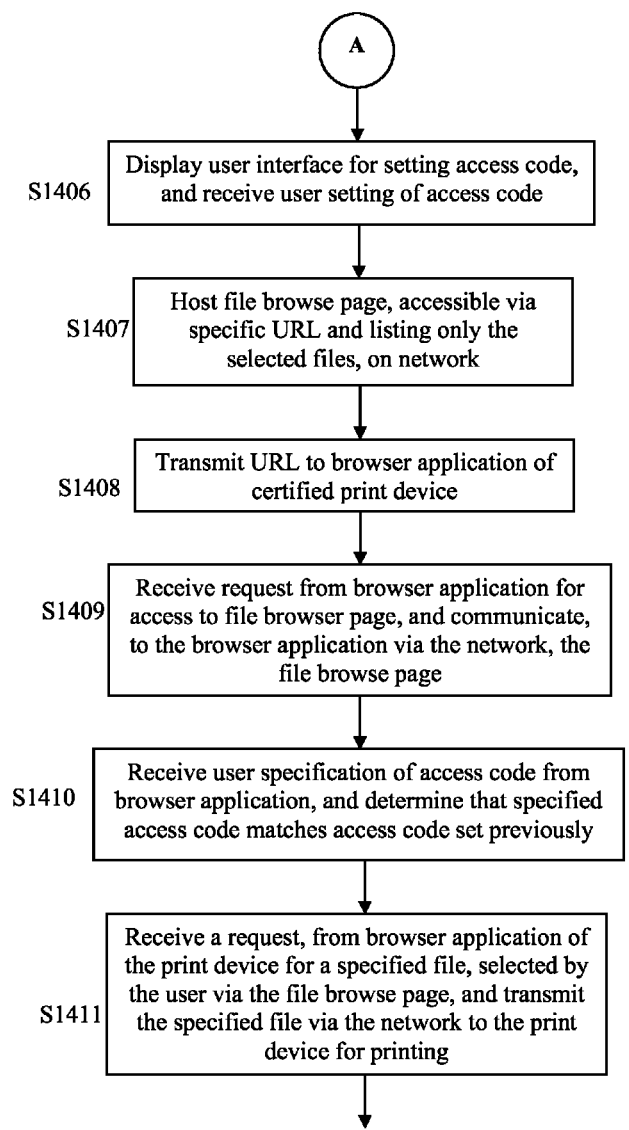

Turning now to FIG. 14, there is shown a more detailed flowchart of a method performed by an apparatus such as mobile terminal apparatus 10 illustrated in FIG. 1, according to another exemplary embodiment.

In S1401, the apparatus 10 identifies one or more print devices within a specific distance (e.g. 1-10 meters) of the terminal apparatus 10. In S1402, the apparatus 10 displays a user interface listing detected print devices (see FIG. 13, for example), and receives user selection of particular print device 17 from the user interface. In S1403, the apparatus 10 establishes a direct communication link 12 between the terminal apparatus 10 and the selected print device 17. In S1404, the apparatus 10 communicates identification information with the selected print device 17 and performs a certification process to certify the selected print device.

Thereafter, in S1405 the apparatus 10 displays a user interface listing files stored on terminal apparatus (see FIG. 9B, for example), and receive user selection of particular files stored on the terminal apparatus 10. In S1406, the apparatus displays a user interface for setting access code (see FIG. 10, for example), and receive user setting of an access code. In S1407, the apparatus hosts a file browse page that is accessible via specific URL and lists only the selected files that were selected in S1405, on network 13. An example of a file browse page is illustrated in FIG. 12. Moreover, in S1408, the apparatus transmits a URL for accessing the file browse page to a browser application of print device 17.

Thereafter, in S1409, the apparatus receives a request from the browser application of the print device 17 for access to the file browser page (e.g. after the browser application accesses the URL provided in S1408). The apparatus 10 communicates, to the browser application of the print device 17 via the network 13, the file browse page. In S1410, the apparatus receives a user specification of an access code from the file browse page displayed on the browser application of the print device (see FIG. 12, for example), and determines that specified access code matches access code set previously on the apparatus 10 side in S1406. Finally, in S1411, the apparatus 10 receives a request, from the browser application of the print device 17 for a specified file, selected by the user of the print device 17 via the file browse page (see FIG. 12, for example), and transmits the specified file via the network 13 to the print device 17 for printing. The order of steps in the aforementioned workflow is merely exemplary, and the various steps may be rearranged as necessary.

Figure 15:
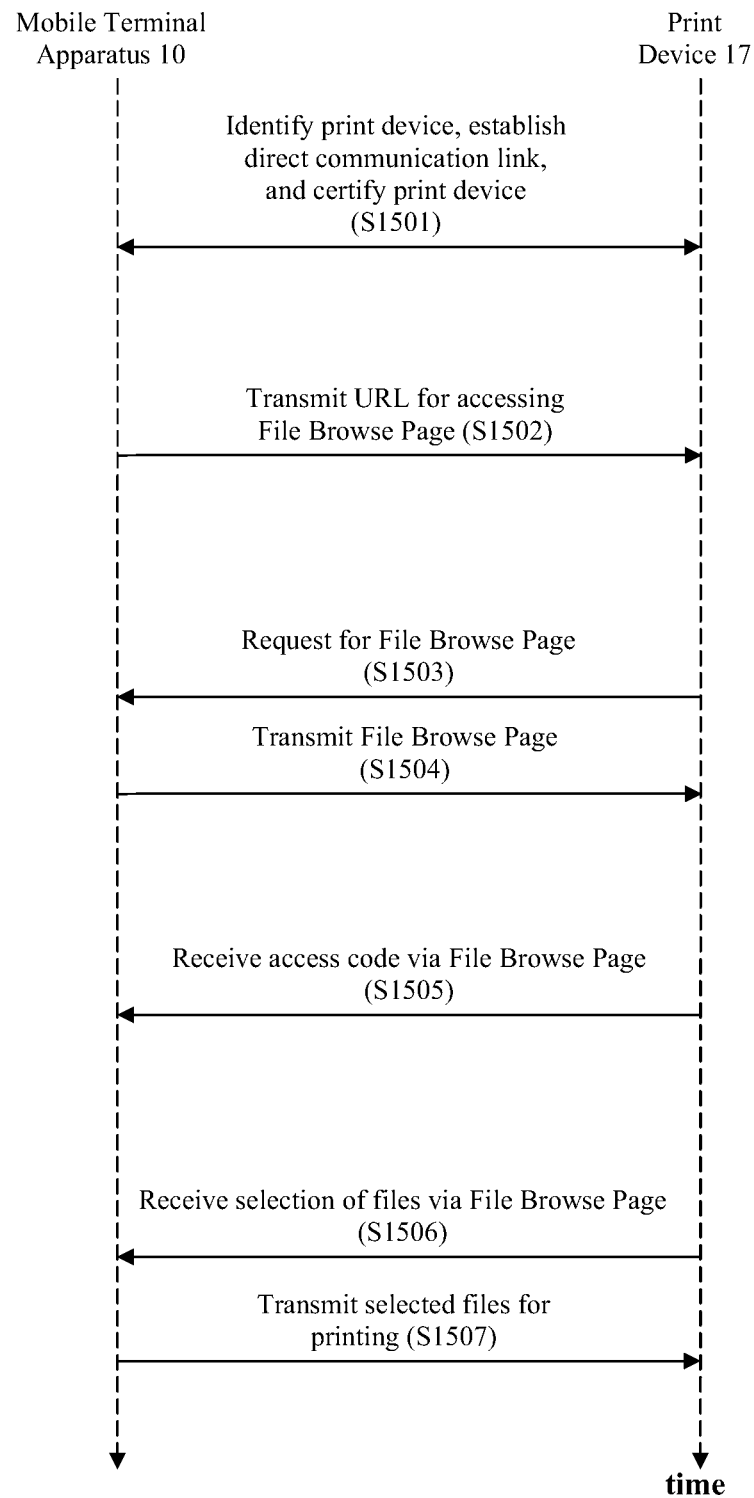
FIG. 15 illustrates a schematic diagram demonstrating a data flow in a system, such as system 100 illustrated in FIG. 1, according to an exemplary embodiment.

Turning now to FIG. 15, there is shown a schematic diagram of a data flow in the system 100 illustrated in FIG. 1, according to another exemplary embodiment.

In S1501, the mobile terminal apparatus 10 identifies the print device 17, establishes a direct communication link 12 with the print device 17, and certifies the print device 17. In S1502, the apparatus 10 transmits a URL for accessing a File Browse Page to the print device 17. In S1503, the apparatus 10 receives a request for access to the File Browse Page from the print device 17. (For example, the print device 17 may access the URL provided in S1502). In S1504, the apparatus 10 transmits the file browse page via the network 13 to the print device 17.

Thereafter in S1505, the apparatus receives user specification of an access code via the File Browse Page being displayed on the browser application of the printing device 17. Further, In S1506, the apparatus receives user selection of files stored on the apparatus 10 via the File Browse Page being displayed on the browser application of the printing device 17. Finally, in S1507, the apparatus 10 transmits the files selected in S1506 to the print device 17 for printing.

Figure 16:
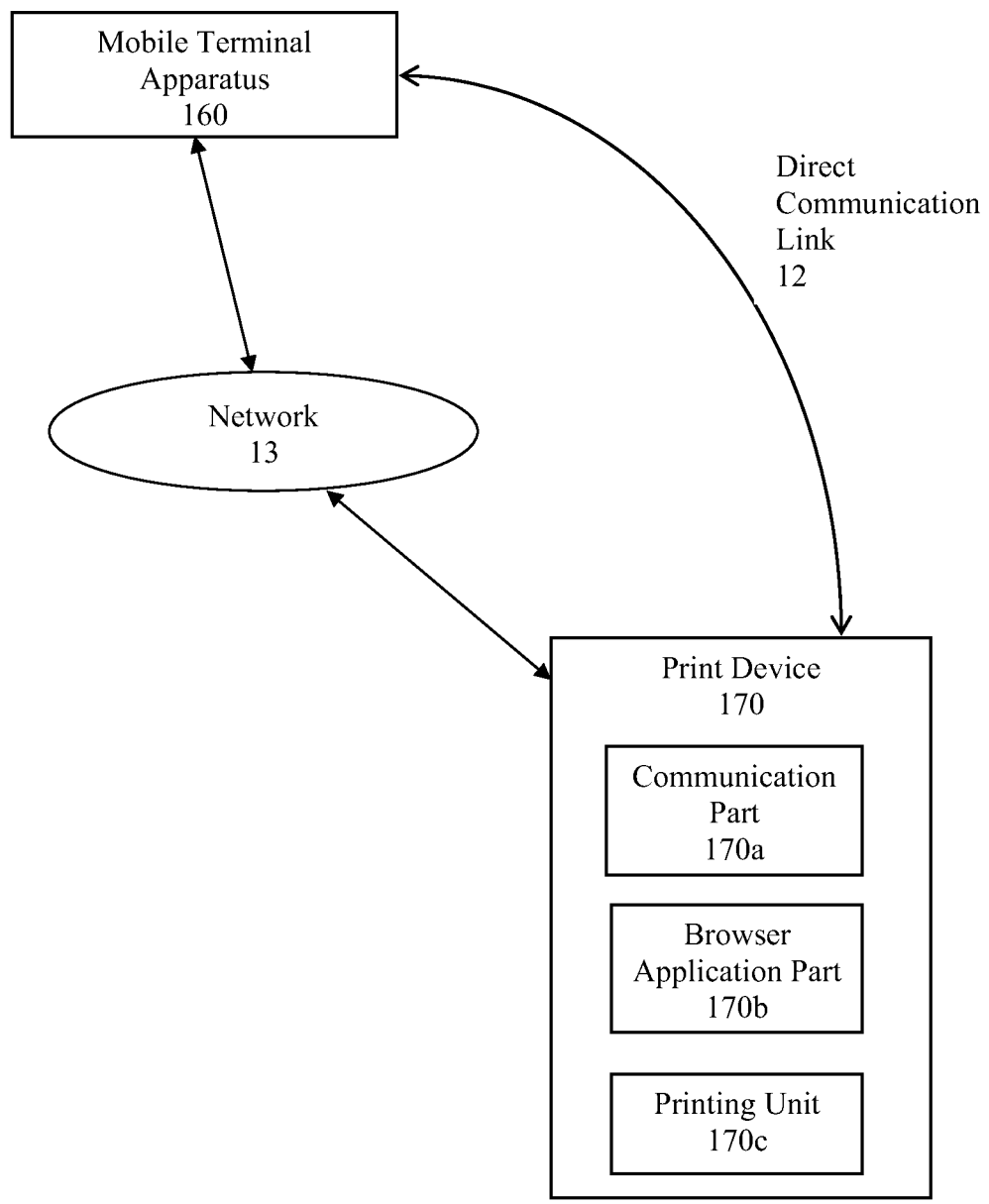
FIG. 16 shows a block diagram of a system including a mobile terminal apparatus and a printing device, according to another exemplary embodiment.

Turning now to FIG. 16, there is illustrated a system 1600 for printing documents and files, according to another embodiment.

System 1600 is similar to system 100 illustrated in FIG. 1, and includes a mobile terminal apparatus 160 (similar to mobile terminal apparatus 10 of FIG. 1) and a print device 170 similar to print device 17 of FIG. 1. Network 13 and direct communication link 12 are similar to those illustrated in FIG. 1.

The print device 17 includes a communication part 170a, a browser application part 170b and a printing unit 170c. The communication part 170 communicates directly with mobile terminal apparatus 160 within a specific distance of the print device, to establish a communication link 12 between the print device 170 and terminal apparatus 10. The browser application part 170b communicates with the terminal apparatus 170 to receive, from the terminal apparatus, a file browse page indicating files stored on the terminal apparatus. An example of such a file browse page is illustrated in FIG. 12. Moreover, the browser application part 170b displays the file browse page on a user interface part or display part (e.g. monitor, screen, etc.) of the print device 170, and receives user selection of one or more of the files stored on the terminal apparatus via the file browse page. The browser application part 170b also transmits a request for the selected file to the terminal apparatus 160 via the network 13, and receives the selected file from the terminal apparatus 160 via the network 13. The printing unit 170c then prints the selected file when received from the terminal apparatus 160.

The browser application part 170b receives resource locator information of the file browse page from the terminal apparatus 160, and the browser application part automatically utilizes the resource locator information to specify a destination address in the browser application to thereby transmit the file access request for the file browse page to the terminal apparatus 160.

The browser application part 170b may also display a user interface for user specification of an access code (see FIG. 12, for example), and transmit, via the network 13, the access code to the terminal apparatus 10. The browser application only receives the file browse page from the apparatus 160 if the terminal apparatus 160 authenticates the access code.

Figure 17:
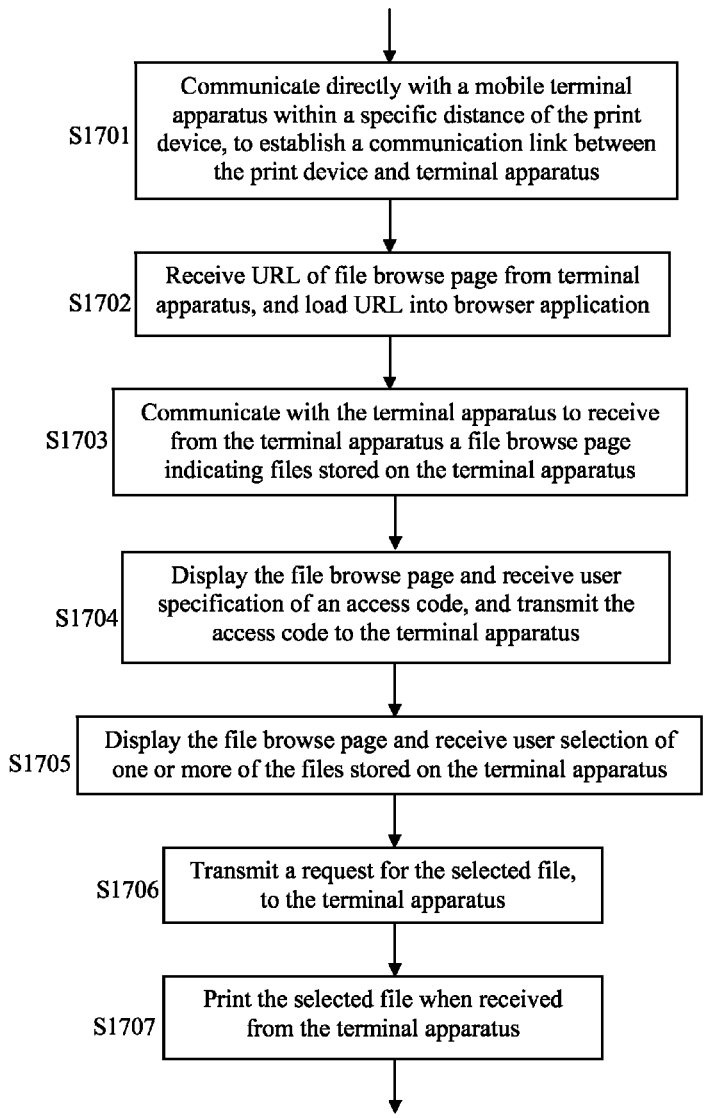
FIG. 17 shows a flowchart of a method performed by a print device, such as print device 170 illustrated in FIG. 16, according to an exemplary embodiment.

Turning now to FIG. 17, there is shown a flowchart of a method performed by a print device such as print device 170 illustrated in FIG. 16, according to an exemplary embodiment.

In S1701, the print device communicates directly with a mobile terminal apparatus within a specific distance of the print device, to establish a communication link between the print device and terminal apparatus. In S1702, the print device receives a URL of a file browse page from the terminal apparatus, and automatically loads URL into a browser application of the print device. In S1703, the print device communicates with the terminal apparatus to receive from the terminal apparatus a file browse page indicating files stored on the terminal apparatus. In S1704, the print device displays the file browse page and receives user specification of an access code, and transmits the access code to the terminal apparatus. In S1705, the print device displays the file browse page and receives user selection of one or more of the files stored on the terminal apparatus. In S1706, the print device transmits a request for the selected file, to the terminal apparatus. Finally, in S17017, the print device prints the selected file when it is received from the terminal apparatus.

The aforementioned embodiments and examples are illustrative, and many variations can be introduced on these embodiments and examples without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A mobile terminal apparatus configured to be connected to a network, said mobile terminal apparatus comprising:
    a device certification part that identifies a print device within a specific distance of the terminal apparatus, establishes a direct communication link between the terminal apparatus and the print device and communicates identification information via the communication link with the print device, and performs a certification process to certify the print device;
    a terminal user interface that provides, to a terminal user, a plurality of candidate files stored on the terminal apparatus, for selection by the terminal user, from the plurality of candidate files, a subset of one or more files to be made available for selection at the print device via a print device user interface of the print device; and
    a file server part that communicates, to the certified print device via the network, a uniform resource locator (URL) for accessing a file browse page, to cause a browser application of the certified print device to load the file browse page specified by the URL for presenting, on the print device user interface, the subset of one or more files amongst the plurality of candidate files available to be printed, and receives a request, from the browser application of the print device, for a specified file, selected by a print device user, and transmits the specified file via the network to the print device for printing, wherein the file browse page indicated by the URL and communicated by the file server part to be presented on the print device user interface of the print device only indicates the subset of one or more files selected from the plurality of candidate files by the terminal user to be made available for selection through the print device user interface to be printed.

2. The mobile terminal apparatus of claim 1, wherein after the print device is certified by the device certification part, the file server part transmits resource locator information of the file browse page to the print device.

3. The mobile terminal apparatus of claim 1, further comprising a user interface for user specification of an access code, wherein the file server part receives, via the network, a specified code from the browser application of the print device, the specified code having been entered by a user of the print device, and only in a case that the specified code matches the access code, the file server part communicates the file browse page indicating the one or more files to the print device.

4. The mobile terminal apparatus of claim 1, further comprising a user interface for user selection of one of plural print devices detected by the device certification part, wherein the device certification part only performs the certification process with the selected print device.

5. The mobile terminal apparatus of claim 1, wherein the device certification part identifies the print device via a short-range wireless connection distinct from said network.

6. The mobile terminal apparatus of claim 1, wherein the device certification part scans a barcode displayed on the print device, and decodes the barcode to identify the print device.

7. The mobile terminal apparatus of claim 1, wherein the print device includes an RFID unit, and the terminal apparatus communicates with the RFID unit of the print device to identify the print device.

8. A method performed by a mobile terminal apparatus configured to be connected to a network, said method comprising:
  (a) identifying a print device within a specific distance of the terminal apparatus;
  (b) establishing a direct communication link between the terminal apparatus and the print device;
  (c) communicating identification information with the print device and performing a certification process to certify the print device;
  (d1) providing a terminal user interface on the mobile terminal apparatus for selection, by a terminal user and from a plurality of candidate files stored on the mobile terminal apparatus, of a subset of one or more files to be made available for selection at the print device via a print device user interface of the print device;
  (d2) communicating, to the certified print device via the network, a uniform resource locator (URL) for accessing a file browse page, to cause a browser application of the certified print device to load the file browse page specified by the URL for presenting, on the print device user interface, the subset of one or more files amongst the plurality of candidate files available for printing; and
  (e) receiving a request, from the browser application of the print device, for a specified file, selected by a print device user from said one or more files via the file browse page, and transmitting the specified file via the network to the print device for printing, wherein the file browse page communicated in (d2) to be presented on the print device user interface of the print device only indicates the subset of one or more files of the plurality of candidate files selected by the terminal user to be made available for selection through the print device user interface to be printed.

9. The method of claim 8, further comprising transmitting resource locator information of the file browse page to the browser application of the print device, after the print device is certified.

10. The method of claim 8, further comprising:
  receiving, via a user interface of the terminal apparatus, a user specification of a first access code;
  receiving, via the network, a second access code from the browser application of the print device, the second access code being entered by a user of the print device,
  determining that the second access code matches the first access code, and communicating the file browse page indicating the one or more files.

11. The method of claim 8, further comprising:
  receiving, via a user interface of the terminal apparatus, a user selection of one of plural detected print devices; and
  performing the certification process only with the user selected print device.

12. The method of claim 8, wherein the print device is identified via a short-range wireless connection distinct from said network.

13. The method of claim 8, further comprising:
  receiving image data corresponding to a barcode displayed on the print device; and
  decoding the image data corresponding to said barcode to identify the print device.

14. A print device for performing a print job, said print device comprising:
  a communication part that communicates directly with a mobile terminal apparatus within a specific distance of the print device, to establish a communication link between the print device and terminal apparatus;
  a browser part that communicates with the terminal apparatus to receive from the terminal apparatus a uniform resource locator (URL) for accessing a file browse page, loads and displays the file browse page specified by the URL, a subset of one or more files, which were selected by a terminal user via a terminal user interface on the terminal apparatus from a plurality of candidate files stored on the terminal apparatus, and receives selection by a print device user of a specified file amongst the one or more of the files indicated on the file browse page to be available as a subset amongst the plurality of candidate files stored on the terminal apparatus, and transmits a request for the selected file, to the terminal apparatus; and
  a printing unit that prints the selected file when received from the terminal apparatus,
  wherein the file browse page indicated by the URL and communicated by the terminal apparatus only indicates the subset selected by the terminal user from the plurality of candidate files.

15. The print device of claim 14, wherein the browser application receives resource locator information of the file browse page from the terminal apparatus, and the browser application automatically utilizes the resource locator information to specify a destination address in the browser application to thereby transmit the file access request to the terminal apparatus.

16. The print device of claim 14, further comprising a user interface for user specification of an access code, wherein the print device transmits, via the network, the access code to the terminal apparatus, and the browser application only receives the file browse page from the file server part, if the terminal apparatus authenticates the access code.

17. The print device of claim 14, wherein the communication part communicates with the mobile terminal apparatus via a short-range wireless connection distinct from said network.

18. The print device of claim 14, further comprising an RFID unit that communicates identification information of the print device.

* * * * *